March 31, 1964 L. W. NICKOLS 3,126,642
GAUGING LINEAR DIMENSIONS
Filed Feb. 11, 1958 8 Sheets-Sheet 3

INVENTOR
Leonard Wilfred Nickols
BY
Stevens, Davis, Miller & Mosher
his ATTORNEYS

March 31, 1964  L. W. NICKOLS  3,126,642
GAUGING LINEAR DIMENSIONS

Filed Feb. 11, 1958  8 Sheets-Sheet 5

FIG. 7.

INVENTOR
Leonard W. Nickols
BY
Stevens, Davis, Miller & Mosher
ATTORNEYS

March 31, 1964 L. W. NICKOLS 3,126,642
GAUGING LINEAR DIMENSIONS
Filed Feb. 11, 1958 8 Sheets-Sheet 6

INVENTOR
Leonard Wilfred Nickols
BY
Stevens, Davis, Miller & Mosher
his ATTORNEYS March 31, 1964 L. W. NICKOLS 3,126,642
GAUGING LINEAR DIMENSIONS
Filed Feb. 11, 1958 8 Sheets-Sheet 7

INVENTOR

Leonard Wilfred Nickols
BY
Stevens, Davis, Miller & Mosher
his ATTORNEYS

March 31, 1964  L. W. NICKOLS  3,126,642
GAUGING LINEAR DIMENSIONS
Filed Feb. 11, 1958  8 Sheets-Sheet 8

FIG. 13.

INVENTOR
Leonard W. Nickols
BY
Stevens, Davis, Miller & Mosher
ATTORNEYS

United States Patent Office 3,126,642
Patented Mar. 31, 1964

3,126,642
GAUGING LINEAR DIMENSIONS
Leonard Wilfred Nickols, Hampton Hill, England, assignor to Power Jets (Research & Development) Limited, London, England, a British company
Filed Feb. 11, 1958, Ser. No. 714,517
Claims priority, application Great Britain Feb. 20, 1957
9 Claims. (Cl. 33—174)

This invention relates to apparatus for measuring linear dimensions.

Various manual methods for measuring linear dimensions are known but these frequently involve considerable expenditure of time without any corresponding advantage gained from high accuracy. It has been proposed to determine the relative positions of two plane surfaces by means of optical and mechanical comparators. Optical comparators have a number of disadvantages including insufficient accuracy for certain applications. In one proposed mechanical comparator, it is possible to compare only one set of plane surfaces without removal of the component including the plane surfaces and replacement by another component.

A common requirement is to measure or compare the distance between successive flanks of the serrations of a "fir-tree" root of a turbine blade. In addition the pitch error in comparison with a standard is often required. It is particularly important in turbine discs that the pressure flanks of the socket serrations, that is, those which take the centrifugal and other forces acting on the blades, should be made within very close spacing tolerances. Similarly the serrations formed in a compressor disc must be within equally close tolerances. Clearly, it would be advantageous to be able to measure or compare a large number of sets of serrations or other plane surfaces without setting the apparatus up afresh for each component including such sets of serrations.

According to the present invention there is provided a measuring apparatus for measuring the distance between a datum surface of a set of surfaces and each of the remaining surfaces of the set, there being a plurality of such sets on a rigid rotatable assembly, comprising a support structure capable of supporting the said assembly; an indexing mechanism adjacent the support structure to move the assembly from a position for measuring one set of surfaces to a position for measuring another set of surfaces including a disc mounted coaxially and fast with the rigid rotatable assembly and having a plurality of notches corresponding in number and spacing to the sets of surfaces, an indexing finger which engages each of the said notches in succession to hold the rigid assembly in a measuring position, and a locking lever which engages a notch of the disc whenever the indexing finger is disengaged from the disc, lever means operable to move the locking lever and a linkage operable by the lever means to effect disengagement of the indexing finger, measuring equipment including a datum surface engaging member; a number of surface engaging members corresponding to the remaining surfaces of each set; means to bring each of the surface engaging members into successive engagement with the corresponding surface; means to measure the displacement of each of the surface engaging members in succession relatively to the datum surface engaging member, and driving means to actuate the measuring equipment; means to actuate the indexing mechanism; and means to synchronise operation of the measuring equipment and the indexing mechanism whereby on completion of the measurement of one set of surfaces by the measuring equipment, the operation of the measuring equipment is stopped and on completion of the indexing movement of the rigid rotatable assembly by the indexing mechanism the operation of the measuring equipment is recommended.

An embodiment of a turbine disc comparator in accordance with the invention will now be described, by way of example, with reference to the accompanying drawings, in which.

Figure 1:
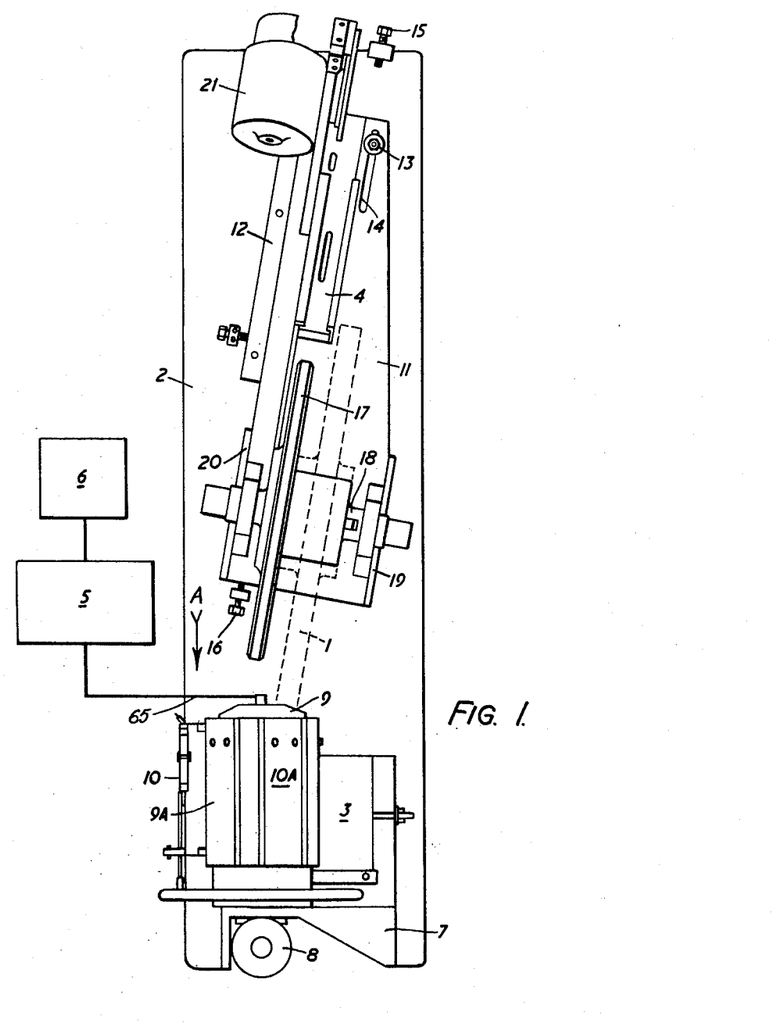
FIGURE 1 is a diagrammatic plan of the complete comparator.

The drawings illustrate an embodiment of the apparatus, hereinafter termed a comparator, with a turbine disc mounted in position for gauging. In FIGURE 1, the turbine disc is denoted generally by reference 1, the main base of the comparator by 2, measuring equipment by 3 and an indexing mechanism which includes a workholder by 4. An amplifier and recorder are shown purely diagrammatically at 5 and 6 respectively, and as these are of known type, no further reference will be made to these parts of the apparatus. The recorder may be replaced by a simple measurement indicator.

The base 2, a robust iron casting, has an accurately plane upper surface and is of sufficiently substantial construction obviate any errors which might result from lack of rigidity. The measuring equipment 3 includes an upright stanchion 7 on which an electric motor 8 is mounted on one side and a turret 9 rotatable about a horizontal axis on the other side. The turret 9 forms a support for a number of feeler members and their associated linkages denoted generally by reference 10 (only one shown). The number of feeler members and associated linkages which are described more fully hereinafter, corresponds to one less than the number of serrations in each set of serrations in the grooves formed on the turbine rotor disc designed to receive the "fir-tree" blade roots. If the number of flat surfaces 9A on the turret exceeds the number of serrations to be measured, then balance weights 10A are secured to any unoccupied flat surface.

The indexing mechanism includes a base 11, slidable on the main base 2 and guided by an adjustable guide 12 and studs 13 slidable in slots 14 (only one shown in FIGURE 1). Adjustable end-stops 15 and 16 are bolted to the main base and serve to locate the indexing mechanism in two alternative extreme positions in the path along which the base 11 is slidable. An indexing disc 17 is mounted on the same shaft 18 as the turbine disc 1 and the shaft 18 is supported on upright plates 19 and 20 bolted at their lower ends to the base 11. A second electric motor 21 is mounted on the base 11 and serves to operate the indexing mechanism.

Figure 2:
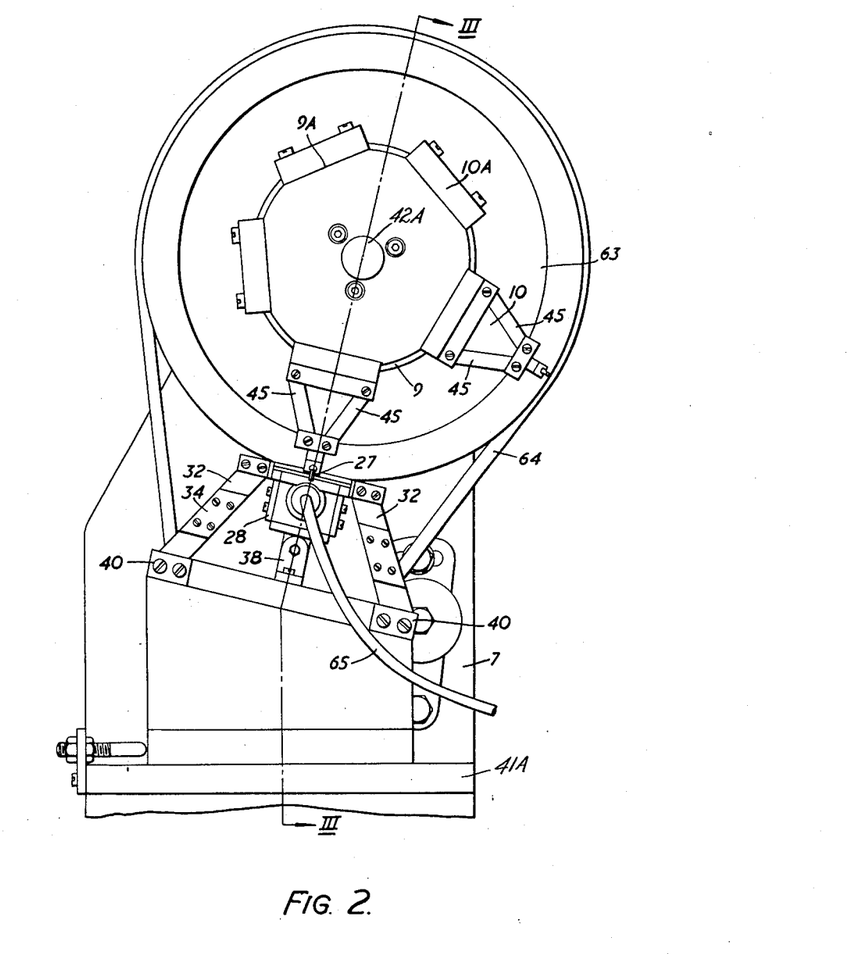
FIGURE 2 is an end view of measuring equipment of the comparator viewed in the direction of the arrow A in FIGURE 1.
Figures 3, 4:
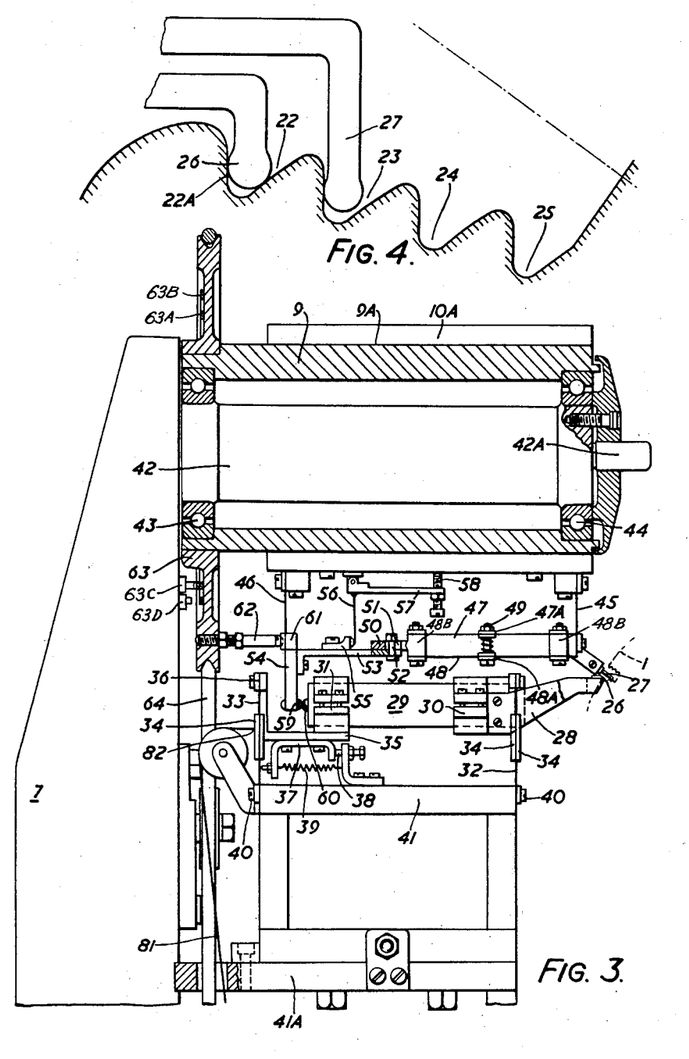
FIGURE 3 is a part-sectional side elevation of the equipment of FIGURE 2 taken on the line III—III of FIGURE 2.
FIGURE 4 is a enlargement of a detail of styli shown in FIGURE 3.

Referring to FIGURES 2, 3 and 4, one set of serrations 22, 23, 24 and 25 is shown, the pressure flanks of each serration lying in parallel vertical planes and the first flank 22A of the serration 22 conveniently forming a datum flank which is engaged by a datum feeler member in the form of a stylus 26 which is of hardened steel or tungsten carbide. The head of this stylus 26 has the form of a small ball (illustrated only diagrammatically in FIGURE 4) rotatably mounted in a socket, which socket is itself secured to a cross-piece in turn mounted on twin arms 28 (FIGURES 2 and 3). A measuring stylus 27, likewise of hardened steel or tungsten carbide and having a substantially spherical head engages one of the other pressure flanks and additional styli (not shown) each mounted similarly to the stylus 27 engage in turn with the remaining pressure flanks of a set of serrations.

The twin arms 28 are rigid with the supports of an electrical measuring or gauging head 29 of known type, the operation of which depends for example on variable inductance. Alternatively the gauging head may be of a known pneumatic type. The gauging head 29 is located with its axis horizontal in two split clamps 30 and 31 which are themselves supported by two pairs of spring-steel strips 32 and 33 arranged in V formation (FIGURE 2). In the measuring position the rim of the turbine disc 1 lies between the extremities of the twin arms 28 and the datum stylus 26 contacts both flanks of the datum serration 22 of one set of serrations (as shown in FIGURE 4). The formation of the strips 32 and 33 ensures that the gauging head 29 can move freely in the direction of its longitudinal axis but is restrained from any movement transverse to its axis. Each strip 32, 33 has a pair of reinforcing plates 34 clamped about the mid-portion which prevents buckling under load. The clamp 31 is secured to the strips 33 by means of an L-shaped arm 35, the upper end of the arm (as shown in the drawing) being secured to a cross-member 36 joining the two strips at the mid-point of the cross-member. The L-shaped arm 35 supports a member 37 having down-turned ends, one of which is arranged to engage an adjustable end-stop 38 and the other of which holds one end of a helical tension spring 39, the other end of the spring being attached to supporting structure of the end-stop 38. The spring-steel strips 32 and 33 are secured by screws 40 to a sloping table 41 adjustably mounted on a slideway 41A extending horizontally and at right angles to the stanchion 7. The slope of the table 41 corresponds to the angle by which the axis of the rotor is inclined to the axis of the serrated sockets.

The turret 9 is mounted for rotation on a stub shaft 42 with the interposition of ball bearings 43, 44. An extension 42A is provided at the free end of the stub shaft 42. The flat surfaces 9A on the turret have associated measuring styli 27 and each of these is attached to the associated flat surface 9A by means of two pairs of spring-steel strips 45 and 46, arranged in V formation as in the case of the strips 32 and 33. (Only one stylus assembly is shown.) Flats 9A for which no stylus is required have balance weights 10A secured to them. The measuring stylus 27 is secured to one end of an adjustable length strut which is formed by two resilient metal strips 47 and 48 clamped at their ends by clamp 48B and by a bolt 49 passing through their mid-points. Plates 47A and 48A are interposed respectively between the bolt head and the adjacent strip 47 and the associated nut and adjacent strip 48 and both plates are bonded to these strips by an epoxy resin. The bolt 49 is adjustable to vary the effective length of the composite adjustable strut by bowing each strip 47, 48. This variation may be very small and the maximum variation possible by this means may amount to only .005 inch (125μ). The sensitivity of adjustment of the particular strut is 0.000001 of an inch (0.25μ). For coarser adjustment, an extension 50 of the adjustable strut 47, 48 is provided with a slot 51. A bolt 52 passes through the slot 51 and through an aperture in a link 53 which is secured to an arm 54 and which extends in the same direction as the adjustable strut 47, 48. By slackening and re-tightening the bolt 52, it will be seen that the position of the measuring stylus can be readily varied. A stop 55 is rigid with the link 53 and abuts against a leaf spring 56. The force exerted by the leaf spring 56 is adjustable by means of a lever 57 pivoted on the turret and having a set screw 58, one end of which contacts the flat surface 9A of the turret. The arm 54 has a button 59 which contacts an anvil 60 of the gauging head 29. An extension 61 of the arm 54 is arranged to engage an end-stop 62 mounted on a pulley wheel 63 driven by a belt drive 64 which serves to rotate the turret. Two cams are mounted on the side of the pulley 63 remote from the stop 62. Cam 63A serves through a switch 63C to put a resistance into the motor circuit whenever a stylus 27 is passing along a serration flank so that the stylus is slowed down and cam 63B serves to stop the turret on completion of the gauging of one set of serrations by actuation of a switch 63D. The belt drive 64 is in turn driven by the electric motor 8 (FIGURE 1) and provides a speed reduction. A cable 65 carries an electric signal from the gauging head to the amplifier 5 (FIGURE 1).

Referring now to FIGURES 5–10, the electric motor 21 of the indexing mechanism is mounted on an inclined support 70 and drives a face plate 71 through a reduction gear (not shown). A web plate 68 extends between the inclined support 70 and a length of standard angle 69. A connecting rod 72 is pivoted at 73 on the face plate 71, the other end of the connecting rod being pivoted at 74 to a plate cam assembly which includes three rigidly secured cams 75, 76 and 77 whereby the cam assembly reciprocates along the support 70. The cam 75 has a cam follower 78 taking the form of a miniature ball bearing and the follower is secured to a lever 79 pivoted on the inclined support 70 at 80 and having a cord 81, preferably of nylon, secured to its lower end which passes around a series of pulleys (not shown) and is eventually attached to the gauging head structure at 82 (FIGURE 3). The cam 76 has a cam follower 83 also taking the form of a miniature ball bearing and in this case the follower is secured to a rod 84 which is secured into a plunger 84A slidable in a block 85. At the lower end of the plunger 84A a pin 86 provides a pivot for an L shaped lever 87 having a knife edge or stop 88 at the end remote from the pivot 86. An apertured arm 89 is mounted at right angles to the L-shaped lever 87 just below the pivot 86 and the free end supports one end of a helical spring 90. The cam 77 has a cam follower 91, again in the form of a miniature ball bearing, secured to a rod 92 which is screwed into a plunger 92A slidable in the block 85. An extension of the plunger 92A passes through apertures in the arm 89 and in an indexing finger 93 which latter is secured to an extension of the L-shaped lever 87. The extreme end of the extension of the plunger 92A has a projection 94 which supports at its free end one end of a helical spring 95. The other end of the spring 95 is secured to the finger 93 and in addition the spring 90 is secured to the opposite side of the finger. The indexing finger 93 is mounted so that it can engage in notches 93B in the indexing disc 17. The rods 84 and 92 are each provided with collars 96 and pins 97 which engage in grooves 97A (FIGURE 8) in a plate 98, thus preventing rotation of the rod assemblies.

Figures 5, 6:
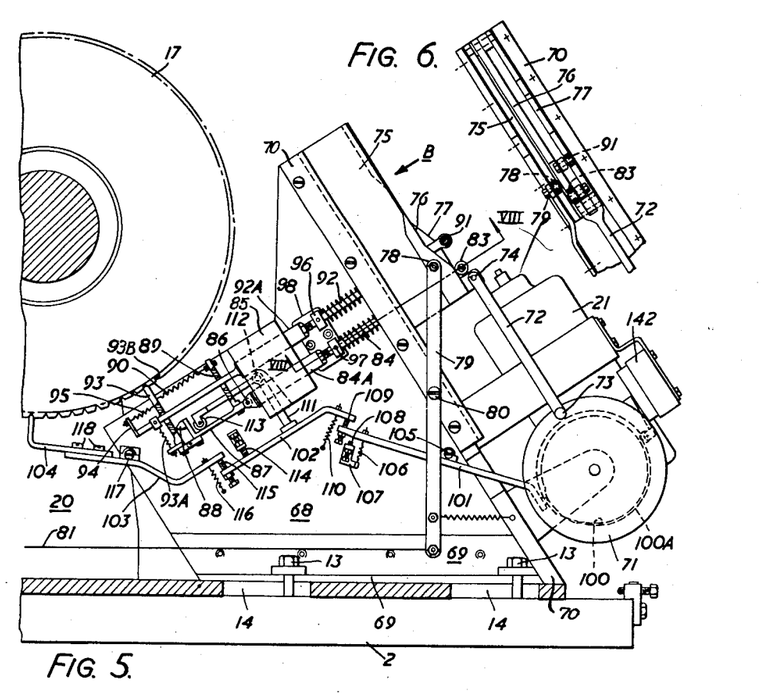
FIGURE 5 is a side elevation of an indexing mechanism of the comparator.
FIGURE 6 is a fragmentary plan of a part of the indexing mechanism of FIGURE 5 viewed in the direction of the arrow B in FIGURE 5.
Figure 7:
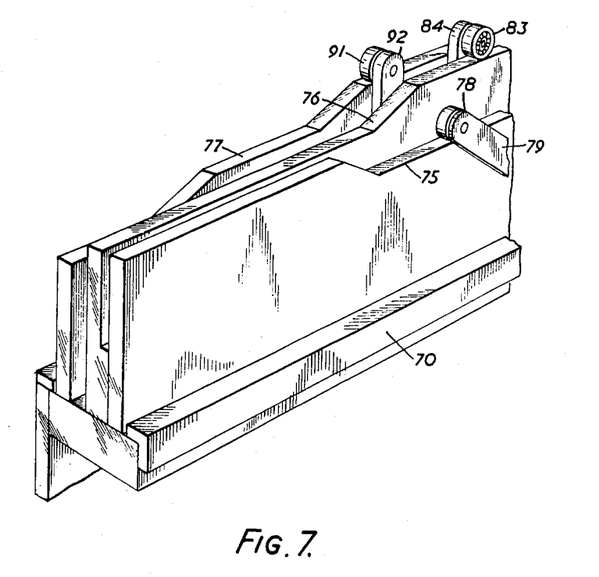
FIGURE 7 is a perspective view of that part of the indexing mechanism shown in FIGURE 6.
Figure 8:
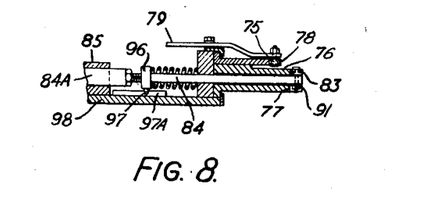
FIGURE 8 is a section on the line VIII—VIII in FIGURE 5.

When the indexing finger 93 is disengaged from the notches the indexing disc 17 and turbine rotor 1 would be free to rotate and it is therefore necessary to provide a locking device to prevent such undesired movement. The locking device includes a series of levers 101, 102, 103 which is actuated by a cam 100 secured for rotation with the face plate 71 and which operates a locking lever 104. The lever 101 is pivoted at 105 on the web 68 and is spring-loaded by a tension spring 106 secured to a projection 107 from the web 68. The projection 107 includes an adjustable end-stop screw 108. The lever 101 has an adjustable screw 109 at its end remote from the cam 100 and this serves to transmit motion to the lever 102 which has a bent-up end adjacent the screw 109. The lever 102 is spring-loaded by a spring 110 and is rigidly secured to a bell-crank lever 111 pivoted at 112 on the block 85 and having a roller 113 at its end remote from the lever 102. An end-stop 114 serves to limit the movement of the lever 102 and an adjustable screw 115 is provided to transmit motion to the lever 103. The lever 103 is spring-loaded by a spring 116 and pivoted on the web 68 by a pivot 117. The locking lever 104 is rigidly secured to the lever 103 by screws 118. A further cam 100A mounted adjacent the face plate 71 serves to control the electric motor 21 by means of a cam follower and micro-switch 142.

Figure 9:
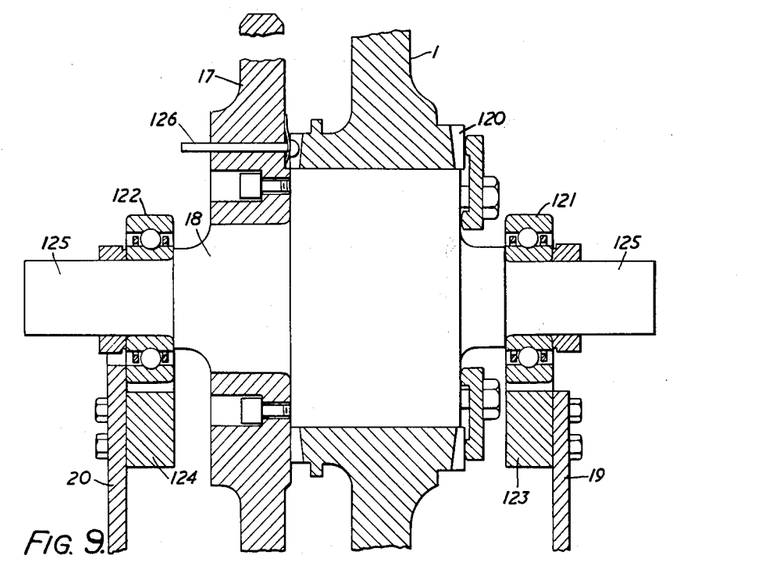
FIGURE 9 is a fragmentary longitudinal section of an indexing disc of the indexing mechanism and of a turbine disc to be gauged.
Figure 10:
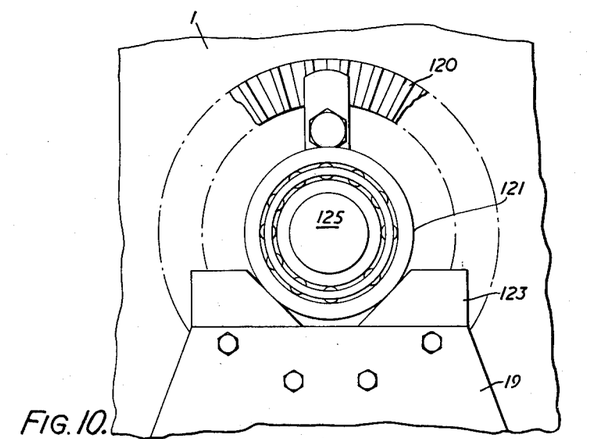
FIGURE 10 is a fragmentary side elevation of the turbine disc as shown in FIGURE 9.

Referring particularly to FIGURES 9 and 10, the turbine disc is drivably connected to the indexing disc 17 by means of Hirth-type coupling teeth 120. Ball bearings 121 and 122 the inner races of which are a tight fit on the mandrel 18 are supported by the uprights 19 and 20 which constitute a work holder in conjunction with V shaped blocks 123 and 124. The blocks 123 and 124 are exactly co-linear. It will be apparent from the drawing that it is possible to move the turbine disc 1 without disturbing the ball bearings 121 and 122 on the mandrel 18. The mandrel 18 has extensions 125 on which a setting fixture can be mounted for setting up the comparator (see FIGURE 13). A spring-loaded plunger 126 is mounted in the indexing disc 17 and projects to engage one of the grooves between the teeth 120 of the Hirth-coupling of the turbine disc. This ensures that the turbine and indexing discs are in correct angular relationship.

Figure 11:
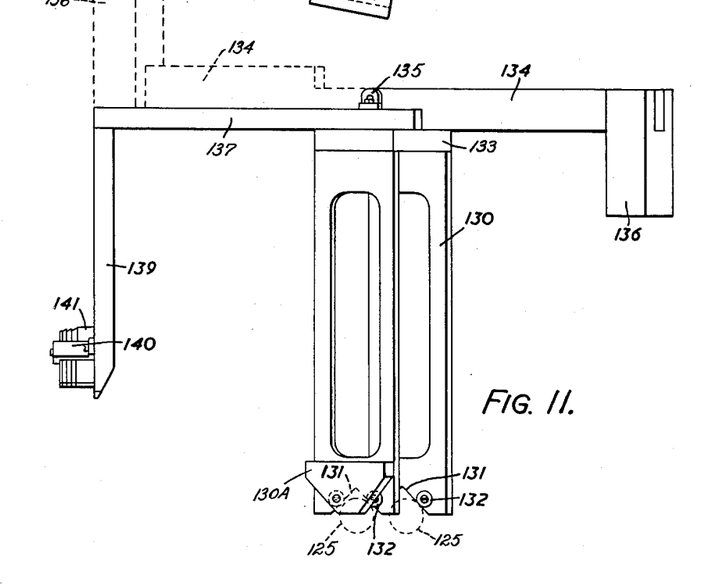
FIGURE 11 is a side elevation of a setting fixture for the comparator.
Figure 12:
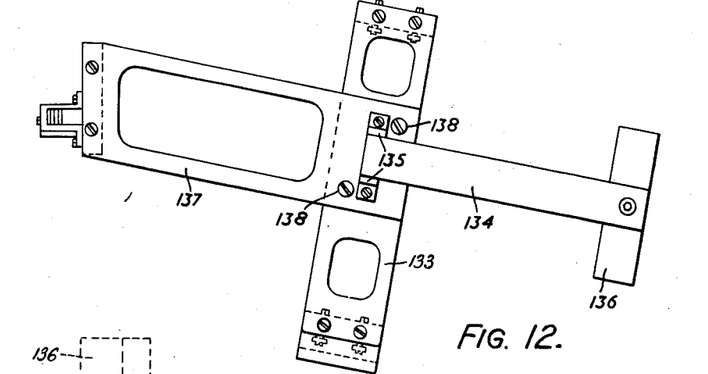
FIGURE 12 is a plan of the setting fixture of FIGURE 10.

Referring to FIGURES 11 and 12, the setting fixture includes two legs 130, the lower ends of which are formed with V-notches 131 having miniature ball bearings 132, set to protrude just beyond the surface of each face of the notches. A plate 130A partly covers one V-notch 131 and serves for end-wise location on one of the extensions 125. The legs 130 are connected at their upper ends (as shown in FIGURE 11) by a cross-member 133 and this member also carries an arm 134 pivoted in bearings 135. The arm 134 supports a balance weight 136 at its free end. A second arm 137 is rigidly secured to the cross-member by screws 138 and has at its end remote from the cross-member 133 a dependent extension 139 having at its lower end a gauge clamp 140 containing a number of setting pieces 141 corresponding to the number of serrations to be gauged and representing the required standard spacing of the serrations. The setting pieces 141 are bevelled along their upper edges and are staggered by the same amount as the serrations to be measured on the turbine disc 1. In effect, the setting pieces simulate a set of serrations. From FIGURES 11 and 12, it will be seen that the setting pieces 141 are disposed at an angle to the second arm 137. This disposition takes into account and corresponds to the angle of the root sockets to the axis of rotation of the turbine disc.

When a turbine disc is to be gauged, the indexing mechanism 4, which includes the supports for the disc is aligned by adjusting the guide 12 and the studs 13 so that the angle by which the serrations are inclined to the rotor axis corresponds to the setting of the indexing mechanism. The pressure flanks (i.e. the surfaces which are loaded by the turbine blades when the disc is rotating) of the serrations 22, 23, 24 and 25 are so arranged that they are in vertical planes when the measuring styli 27 are in operation. When the complete series of pressure flanks have been gauged on one side of the root sockets, the disc is reversed on the mandrel 18 and a similar gauging operation is then carried out for the remaining pressure flanks. The turbine disc is in either case mounted with its axis horizontal and for each set of serrations, the distances from the datum serration 22 to the pressure flanks 23, 24 and 25 of the set are measured. From the foregoing description, it will be appreciated that the gauging head 29 is free within limits to float horizontally so that it is able to assume a position in a correct relationship to the datum serration of the set of serrations being measured.

Figure 13:
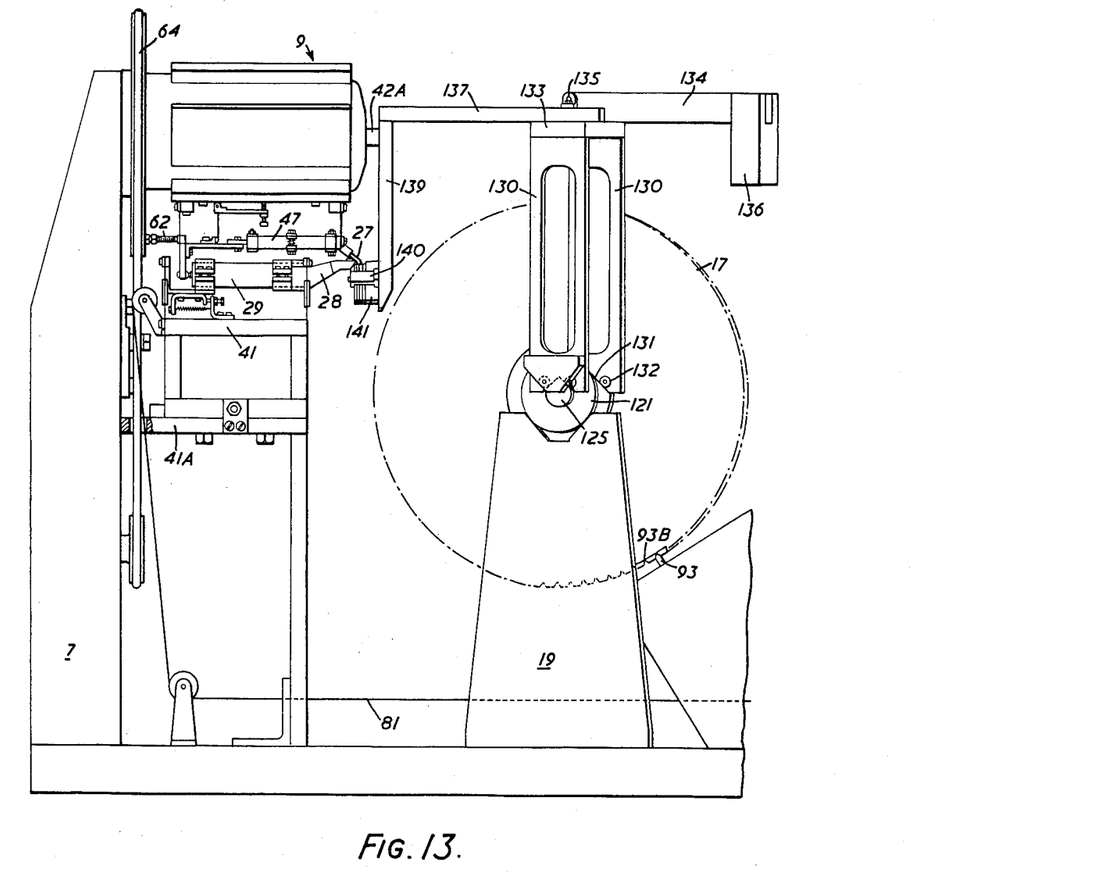
FIGURE 13 is an outline side elevation of a part of the comparator with the setting fixture in position.

For each of any given set of serrations, the apparatus must be set to give a zero reading on the gauging head 29 for the standard distances. In order to do this, the setting device shown in FIGURES 11 and 12 is used and to set the measuring styli to the standard setting, the whole of the indexing mechanism is slid on its base 11 until the end-stop 15 is contacted. In this position, the setting device is placed with the V-notches 131 on the extensions 125 of the mandrel 18 (FIGURE 13). To facilitate the use of the fixture the arm 134 may be swung over to the position indicated in broken lines (FIGURE 10) to convert the clockwise turning moment into an anticlockwise moment about the mandrel 18. In the latter position, the fixture may be allowed to locate itself on the plain diameter extension 42A at the end of the horizontal stub shaft 42 on which the turret is mounted. The setting pieces will then be below and clear of the datum stylus 26. The fixture is more readily placed on and removed from the comparator in this condition. The balance weight 136 is swung to its extended position, that is, as shown in full lines in FIGURES 11 and 12, and the dependent extension 139 is then in close proximity to the measuring styli 27. The datum serration on the fixture is held in contact with the datum stylus 26 with the same force as that with which the datum serration 22A on the turbine disc engages the datum stylus. The positions of the setting pieces 141 on the working face are so adjusted that when the datum stylus contacts the datum serration on the fixture the working surfaces are truly vertical, normal to the axis of the gauging head 29 and the datum serration is in the same position as that to be occupied by the corresponding serration on the turbine disc 1. The turret 9 is rotated to each measuring stylus 27 in turn and the adjustable strut 47, 48 adjusted by means of the bolt 49 until a zero reading is shown on the recorder 6 or other indicator. When each of the styli has been adjusted, the setting device is removed and the whole of the indexing mechanism returned to the position in which it abuts the end-stops 16.

The sequence of operations brought about by the rotation of the face plate 71 and the cams 100 and 100A will now be described commencing with the configuration shown in FIGURE 5. In this configuration, both datum and measuring styli 26, 27 are disengaged. The locking lever 104 is in engagement with one of the notches 93B of the indexing disc 17 and the indexing finger 93 with another notch of the indexing disc. The cord 81 is in a tensioned condition and thus holds the datum stylus 26 out of contact with the turbine disc 1. On rotating the face plate 71 in an anticlockwise direction the cam follower of the lever 101 descends from the nose of the cam 100, thus allowing the bell-crank lever 111 to rotate through a small angle in a clockwise direction under the influence of the spring 93A acting through the L-shaped arm 87. Movement is limited by the engagement of the finger 93 in a notch 93B. At the same time, the locking lever 104 moves away from the indexing disc 17 because of the anti-clockwise movement imparted by the lever 102. The rod 84 and plunger 84A then move at a rate controlled by the slope of the cam face 76 and displace the finger 93 to the left by means of the stop or knife edge 88. Before this movement is completed, the rod 92 moves under the influence of the cam 77 and through the spring 95 and the indexing finger assists the stop 88 to rotate the indexing disc 17 through a small angle in a clockwise direction. At the same time through the lever 79 the cam 75 releases the tension in the cord 81 thus enabling the datum stylus 26 to move until the adjustable stop 38 is engaged. In this position the datum stylus 26 is above, but well clear of, the datum serration 22. A small further movement of the extension of the rod 92 pulls the indexing finger 93 by means of the tension spring 95 and thus causes the indexing disc 17 and turbine disc 1 to make a small clockwise rotation thus causing the datum stylus to engage the datum serration with a force dependent upon the tension of the spring 95. For a major portion of the return movement of the cams 75, 76 and 77 there is no movement of the rods 92 and 84. During this period the cam 100A operates the micro-switch 142 which starts the turret motor 8. The details of operation of the styli 26, 27 are given below. After each serration has been gauged by the corresponding stylus 27 the motor is stopped by the micro-switch 63D operated by the cam 63B rotatable with the turret pulley wheel 63. The cam 75 then brings about an anticlockwise rotation of the lever 79 thus retensioning the cord 81. Almost simultaneously, the rod 92 moves upwards thus slacking the tension in the spring 95. The rod 84 follows, but before this return movement can cause an equal return movement of the indexing disc 17 the nose of the cam 100 is engaged by the lever 101 thus rotating the bell-crank 111 in an anticlockwise direction and allowing the locking lever 104 to engage a notch on the indexing disc 17. The small anticlockwise movement permits the datum stylus 26 to disengage from the datum serration 22A. The roller 113 causes the L-shaped arm to pivot about the pivot 86 and therefore to withdraw the indexing finger 93 from the old notch. A new notch is engaged when the nose of the cam 100 is passed and the spring 93A urges the indexing finger into such engagement.

As the turret 9 is rotated the cam 63A mounted on the pulley 63 contacts the micro-switch 63C which brings into circuit a resistance which reduces the speed of the motor 8, thus allowing the measuring stylus 27 to move along the relevant pressure flank at a reduced speed. This reduction in speed permits reading of the recording or indicating instrument 6 and also allows the stylus to engage the serrations without shock. When the measuring stylus 27 contacts the pressure flank to be measured, any movement is transmitted by the adjustable strut 48, 49 to the button 59 which in turn transmits the movement to the anvil 60 of the gauging head 29 through the extension 50, the link 53 and the arm 54. The electrical signal generated passes through the cable 65 to the amplifier 5 and the recorder 6. Excessive movement of the adjustable strut 48, 49 and associated parts is prevented by the end-stop 62 secured to the pulley wheel 63. The measuring force applied by the measuring stylus 27 can be adjusted by the spring 56, the lever 57 and the set screw 58. A suitable measuring force is of the order of 8 ounces. When one pressure flank has been gauged, the cam 63A on the pulley 63 causes the resistance in the motor circuit to be short-circuited and the turret 9 rotates at a higher speed until the next measuring stylus assembly is reached. The sequence of operation is then repeated and the turret rotates until the second cam 63B on the pulley 63 actuates the switch 63D to stop the motor 8 when each of the pressure flanks has been gauged.

The stop 38 (FIGURE 3) is adjusted so that when the datum stylus 26 contacts both flanks of the datum serration 22, the gauging head 29 moves slightly away from the stop and is thus located in the direction of measurement only by the datum serration. This position constitutes the measuring position.

The above described comparator has been designed to gauge a turbine disc, but it will be appreciated that other forms of disc, such as compressor discs, can be gauged and in addition, it is possible to arrange a series of turbine or compressor blades on a rotatable fixture, thus permitting gauging of a large number of blade roots without resetting the comparator.

I claim:
1. Measuring apparatus for measuring the distance between a datum surface of a set of surfaces and each of the remaining surfaces of the set, there being a plurality of such sets on a rigid rotatable assembly, comprising a support structure capable of supporting the said assembly; an indexing mechanism adjacent the support structure to move the assembly from a position for measuring one set of surfaces to a position for measuring another set of surfaces including a disc mounted coaxially and fast with the rigid rotatable assembly and having a plurality of notches corresponding in number and spacing to the sets of surfaces, and an indexing finger which engages each of the said notches in succession to hold the rigid assembly in a measuring position, a locking lever which engages a notch of the disc whenever the indexing finger is disengaged from the disc, lever means operable to move the locking lever and a linkage operable by the lever means to effect disengagement of the indexing finger; measuring equipment including a datum surface engaging member, a number of surface engaging members corresponding to the remaining surfaces of each set, means to bring each of the surface engaging members into successive engagement with the corresponding surface, means to measure the displacement of each of the surface engaging members in succession relatively to the datum surface engaging member, and driving means to actuate the measuring equipment; means to actuate the indexing mechanism; and means to synchronise operation of the measuring equipment and the indexing mechanism whereby on completion of the measurement of one set of surfaces by the measuring equipment, the operation of the measuring equipment is stopped and on completion of the indexing movement of the rigid rotatable assembly by the indexing mechanism the operation of the measuring equipment is recommenced.

2. Apparatus as claimed in claim 1, in which the indexing mechanism includes a series of plate cams, a crank arrangement connected to reciprocate the plate cams and driven by the means to actuate the indexing mechanism, and cam follower means connected to the indexing finger.

3. Apparatus as claimed in claim 2, in which the synchronising means includes a lever operable by one of the cams of the series of plate cams and a cord attached to the last-mentioned lever which serves to control the position of the datum surface engaging member.

4. Apparatus as claimed in claim 2, in which the synchronising means includes a cam driven by the means to actuate the indexing mechanism and a cam follower operable to control the measuring equipment.

5. Apparatus as claimed in claim 2, in which the indexing mechanism includes an inclined guide structure whereon the plate cams are slidable.

6. Apparatus as claimed in claim 2, including a control cam rotatable with the means to drive the indexing mechanism and having a follower which serves to initiate operation of the means to actuate measuring equipment.

7. Apparatus as claimed in claim 1, in which the measuring equipment includes a rotatably mounted turret carrying at spaced stations thereon the said surface engaging members, a cam rotatably mounted with the turret, means actuated by the said cam to reduce the speed of rotation of the turret whenever a surface engaging member is in engagement with a surface, a strut of adjustable length, and two pairs of resilient strips each pair being disposed with the individual strips at an angle to each other at a region of attachment to the strut and being attached at their other ends to the turret, one of the surface engaging members being secured to one end of the strut and the resilient strips permitting only longitudinal movement of the strut in relation to the turret.

8. Measuring apparatus for measuring the distance between a datum surface of a set of surfaces and each of the remaining surfaces of the set, there being a plurality of such sets on a rigid rotatable assembly, comprising a support structure capable of supporting the said assembly; an indexing mechanism adjacent the support structure including an inclined guide, an electric motor, a circular plate driven by the electric motor, a connecting rod pivotably secured to the periphery of the plate, a first and a second plate cam reciprocable by the connecting rod along the inclined guide, a disc mounted coaxially and fast with the rigid rotatable assembly and having a plurality of notches corresponding in number and spacing to the sets of surfaces, an indexing finger which engages each of the said notches in succession to hold the rigid assembly in a measuring position, a first cam follower operable by the first plate cam, a second cam follower operable by the second plate cam, a lever pivotably connected to the first cam follower and connected to the indexing finger, a spring loaded rod connected to the second cam follower which serves to move the indexing finger together with the indexing disc to another measuring position, a rotary cam rotatable with the circular plate a cam follower operable by the rotary cam, a first pivotable lever carrying the last-mentioned cam follower, a second pivotable lever actuated by the first lever, a bell-crank lever rigid with the second lever and operable to disengage the indexing finger from one of the notches of the disc, and a third pivotable lever operable by the second lever to lock the indexing disc against rotation whenever the indexing finger is disengaged from the indexing disc; measuring equipment including a datum surface engaging member, a number of surface engaging members corresponding to the remaining surfaces of each set, means to bring each of the surface engaging members into successive engagement with the corresponding surface, means to measure the displacement of each of the surface engaging members in succession relatively to the datum surface engaging member, and driving means to actuate the measuring equipment; and means to synchronise operation of the measuring equipment and the indexing mechanism whereby on completion of the measurement of one set of surfaces by the measuring equipment, the operation of the measuring equipment is stopped and on completion of the indexing movement by the indexing mechanism the operation of the measuring equipment is recommenced.

9. Apparatus as claimed in claim 8, in which the second cam is shaped to give a first movement of the indexing finger to position the datum stylus adjacent a datum surface and a second movement to cause engagement of the said surface and the datum surface engaging member.

References Cited in the file of this patent

UNITED STATES PATENTS

| | | |
|---|---|---|
| 2,026,784 | Hansen | Jan. 7, 1936 |
| 2,355,092 | Meister | Aug. 8, 1944 |
| 2,493,147 | Kasper | Jan. 3, 1950 |
| 2,690,620 | Arelt | Oct. 5, 1954 |
| 2,697,879 | Tandler | Dec. 28, 1954 |
| 2,844,877 | Mogolis | July 29, 1958 |
| 2,914,861 | Flair | Dec. 1, 1959 |
| 2,944,342 | Bartlett | July 12, 1960 |

FOREIGN PATENTS

| | | |
|---|---|---|
| 938,446 | Germany | Feb. 2, 1956 |

OTHER REFERENCES

Aircraft Production, pp. 89095, March 1952.